United States Patent [19]

Mullarky

[11] Patent Number: 5,261,613
[45] Date of Patent: Nov. 16, 1993

[54] STATIONARY DISC CUTTING ASSEMBLY

[76] Inventor: Richard Mullarky, 9783 Halifax St., Ventura, Calif. 93004

[21] Appl. No.: 10,855

[22] Filed: Jan. 29, 1993

[51] Int. Cl.⁵ .............................................. B02C 17/02
[52] U.S. Cl. .................................... 241/95; 241/169.1
[58] Field of Search .................. 241/95, 169.1, 169, 241/DIG. 27, 100, 169.2

[56] References Cited

U.S. PATENT DOCUMENTS

| | | | |
|---|---|---|---|
| 953,790 | 4/1910 | Meseraull | 241/296 |
| 2,844,176 | 7/1958 | Barrows et al. | 241/296 |
| 3,495,640 | 2/1970 | Gluckstein | 241/296 |
| 3,552,460 | 1/1971 | Cooney | 241/95 X |
| 3,642,045 | 2/1972 | Buvelot | 241/169.1 |
| 3,746,062 | 7/1973 | Nystrom et al. | 241/296 |
| 4,212,430 | 7/1980 | Dale et al. | 241/169.1 |
| 4,366,930 | 1/1983 | Trombetti | 241/169.1 X |
| 4,505,433 | 3/1985 | Selenke | 241/169.1 |
| 4,714,205 | 12/1987 | Steinko | 241/95 |
| 5,071,663 | 12/1991 | Dugan | 241/168 |

Primary Examiner—Douglas D. Watts
Attorney, Agent, or Firm—Kenneth J. Hovet

[57] ABSTRACT

A stationary cutting plate is releasably secured about an annular joint between a base housing and a housing extension. The plate overlies a cavity in the housing which serves as a receptacle for cut particles. The housing extension is hollow to provide a feed chamber above the plate. A free-standing partition extends upwardly into the extension from a ring which is supported by the upper surface of the cutting plate. The plate has scoop-shaped cutting elements which are distributed about imaginary concentric circles emanating from the plate center axis. Even numbers of the elements are unevenly spaced-apart along respective circles but are diametrically opposed from each other. A slotted driver implement is used to engage the partition and cause its rotation for lateral movement of feedstock into the cutting elements. The implement is also used to simultaneously push the feedstock downwardly against the cutting elements.

20 Claims, 2 Drawing Sheets

STATIONARY DISC CUTTING ASSEMBLY

BACKGROUND OF THE INVENTION

1. Field Of The Invention

The present invention relates to cutting apparatus and, more particularly, to a device having a stationary cutting means for severing predetermined-sized particles from a solid mass.

2. Description of Related Art

The device claimed does not seek to shred slivers of material from a larger mass nor grind, mill, crush or abrade such material. The object is to sever particles of a predetermined size from a given feedstock while minimizing harm to the cellular integrity of both the feedstock and the cut particles. This is important in the handling of some types of foodstuffs, chemicals and medical-related products and processes.

Especially in the field of bone grafting, cell vitality and bone regeneration are adversely affected by grinding, crushing or pulverizing processes. Thus, the invention provides a means to cut particles from pieces of bone with a shearing action that minimizes cellular damage.

Although entirely oblivious to the above purposes, U.S. Pat. No. 3,642,045 sets forth a cheese grater that is structurally related to the invention. It utilizes an open-ended outer casing with a grater plate supported by a shoulder about the lower inside of the casing. A second open-ended driver casing telescopes into the first casing. It has a partition secured to its opposing inner walls with a central pivot for extending through a central aperture in the grater plate. A third element called a pusher with a slotted bottom wall engages the partition when inserted into the driver casing. Rotation of the pusher causes rotation of the driver casing which moves chunks of cheese in the driver casing across the grater plate.

Some of the problems with the above are: 1) The partition cannot be removed from the drive casing for cleaning and sterilization. 2) There is no enclosure for receiving the grated particles. 3) When pushing materials against the grater plate, they will oftentimes move outwardly and become lodged in the spacing between the outer casing and driver casing. 4) The assembly requires a pivot shaft and cross pin to prevent the driver casing from being forced away from the grater by the peripheral accumulation of uncut material. 5) Because the driver casing and grater plate are pinned together, relative movement for cutting becomes impossible whenever the grater plate is dislodged, binds-up or becomes slightly elevated from the housing shoulder by accumulation of material under the plate. In fact, it is most often necessary to continuously force down the driver casing and attached plate against the housing shoulder by grasping the narrow upper ledge with one hand while rotating the pusher with the other hand.

Another prior art device using a cutter plate is shown in U.S. Pat. No. 953,790. In this patent the plate covers the open end of an enclosure and a vegetable in the enclosure is pushed against the plate as it rotates. The grated material is accumulated within the same enclosure. The openness of the enclosure, the vertical alignment of the plate, the radially aligned grater blades and the plate rotation make this device entirely dissimilar to the present invention.

In the field of bone grafting, live bone is comminuted for subsequent grafting purposes with auguring devices and rongeur assemblies. These devices, which are oftentimes powered, function to gnaw, nip, chew and pulverize the bone. When the devices are operated at high velocities, the bone becomes overheated. Also, the harsh mechanical processing results in a destruction of most of the bone cells. As such, most bone material subjected to the above become unusable for grafting purposes.

SUMMARY OF THE INVENTION

With the present invention, a uniquely designed cutter plate is stationarily secured about an annular joint between a base housing and a housing extension. This arrangement entirely eliminates any opportunity for dislodgement of the cutter plate and inoperativeness of the device. It also provides an enclosed area for accumulation of the cut particles.

In particular, the invention provides a device that cleanly, efficiently and gingerly produces pre-sized particles from a given mass of severable material. It provides a housing extension with a central bore which defines a feed inlet area. A base housing is provided with an interior cavity which is closed by an overlying cutter plate for receipt of the severed material. This permits the creation of a sterile environment whenever the need arises.

Additionally, because the joint between the base and extension is used to secure a unique cutter plate, the invention is only operable when the base and extension are attached. Therefore, there is no chance for dislodgement of the cutter plate during operation of the device.

Still further, an independently movable lateral transfer means is provided above the cutter plate. By having such means independent of the plate, no external forces will be imparted to the plate which may adversely affect its function.

Furthermore, the cutter plate is provided with cutting elements arranged in a unique geometrical arrangement about the plate. The effect is a more efficient cutting operation. Also, the cutting elements themselves are uniquely designed to cleanly sever predetermined-sized particles with minimum harm to the cellular structure of the particles.

DESCRIPTION OF THE PREFERRED EMBODIMENTS

Figure 1:
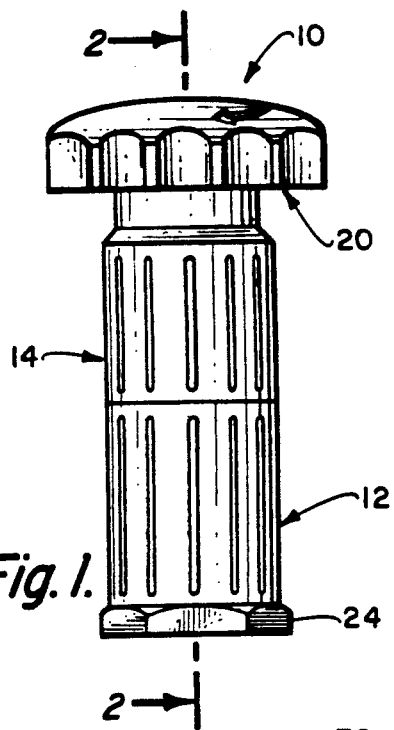
FIG. 1 is a side elevational view of the invention in assembled form ready for operation.

With reference now to the drawings, the overall invention in assembled form is shown by reference 10 in FIG. 1. The basic components of the assembly comprise a base housing 12, a housing extension 14, a cutter plate 16, a lateral transfer means 18 and a driver means 20.

Figure 2:
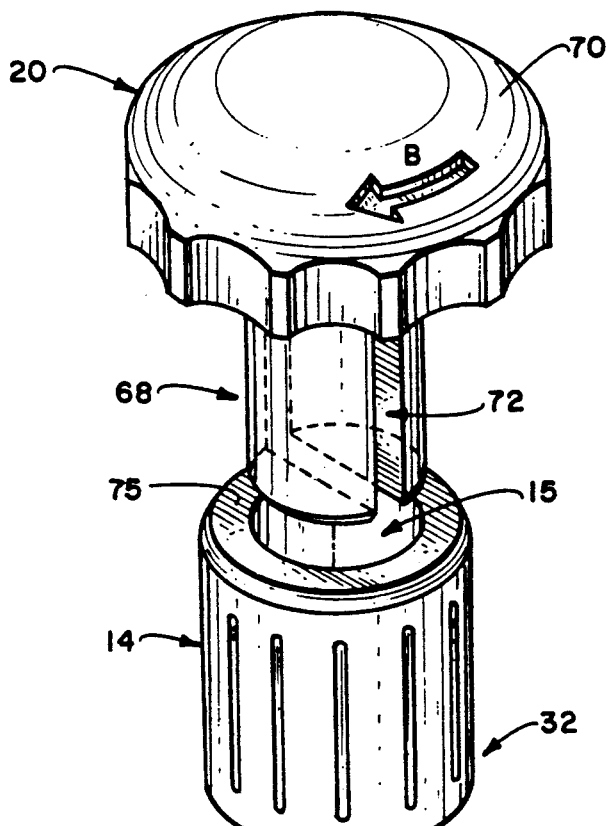
FIG. 2 is an enlarged cross-sectional view taken along lines 2—2 of FIG. 1.
Figure 2:
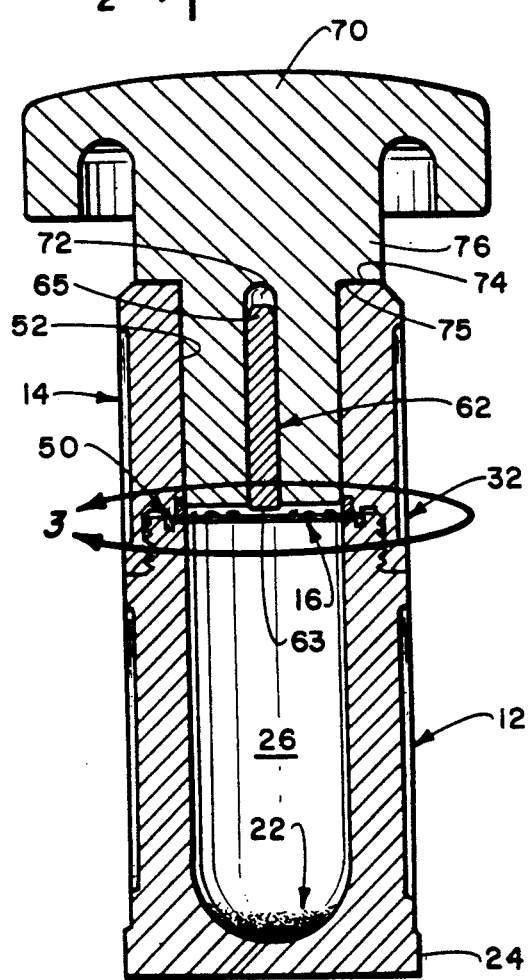
Figure 7:
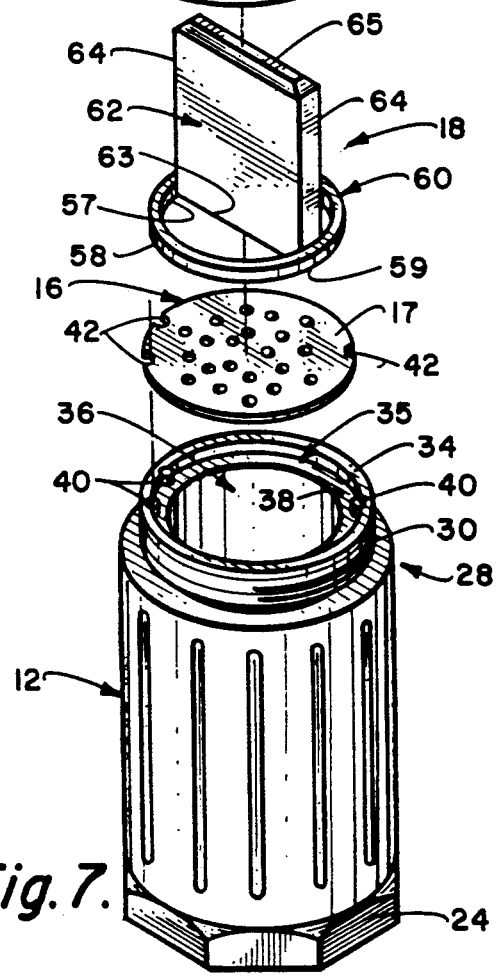
FIG. 7 is an exploded isometric view of the parts forming the assembly shown in FIG. 1.

As best shown in FIGS. 2 and 7, the base housing provides a receptacle for the gravity receipt of cut particles 22 which have been severed from a solid mass of feedstock material (not shown). It includes a flat bottomed pedestal portion 24 so that it can be free standing. This portion also provides a closed interior bottom 25 for cavity 26. Preferably, the cavity has a cylindrical shape and the bottom is concave for ease of cleaning.

Upper portion 28 of the base housing is provided with releasable attachment means for effecting an annular joint connection with the housing extension. As shown, such means comprises base threads 30 for rotational connection to corresponding extension threads 31 on the inside of extension attachment end 32. Other means known in the art could be used such as clamps, latches, set screws and pivot hook mechanisms.

The upper portion terminates at rim 34 which defines top opening 36 of the base housing and cavity. The rim includes a recessed portion 35 which extends downwardly to form an inner ledge 38. The recessed portion depth is about equal to the plate thickness and its diameter is slightly greater than the cutter plate diameter. In this way, the plate will rest on the ledge with its upper surface 17 about flush with the rim.

To help maintain the plate stationary within the recessed portion, the ledge is equipped with anti-rotation means. With reference to FIGS. 2 and 7, such means is shown as pegs 40 upstanding from predetermined locations about ledge 38. They extend upwardly from the ledge to a height about level with rim 34. Three pegs are used which are unevenly spaced-apart about the ledge. This prevents registration with corresponding notches 42 on the cutter plate circumference in case someone might attempt to install the plate upside down. Using three pegs also functions to create a triangular constraint against lateral movement of the plate within the area defined by the recessed portion.

The cutter plate preferably comprises a thin flat circular disc having cutting means for severing particles of a predetermined size from a solid mass that is moved thereacross. The cutting means comprises a plurality of cutting elements adjacent openings through the cutter plate. The elements extend upwardly from plate surface 17 and are arranged in a predetermined circular pattern about the plate.

As shown in FIGS. 4-7, each element comprises a scoop cutter 46 having an arched scoop-shaped blade 47 extending over a portion of a corresponding cutter opening 48. Each blade is aligned to face in the same circular direction as shown by arrow "A" in FIG. 4.

Figure 4:
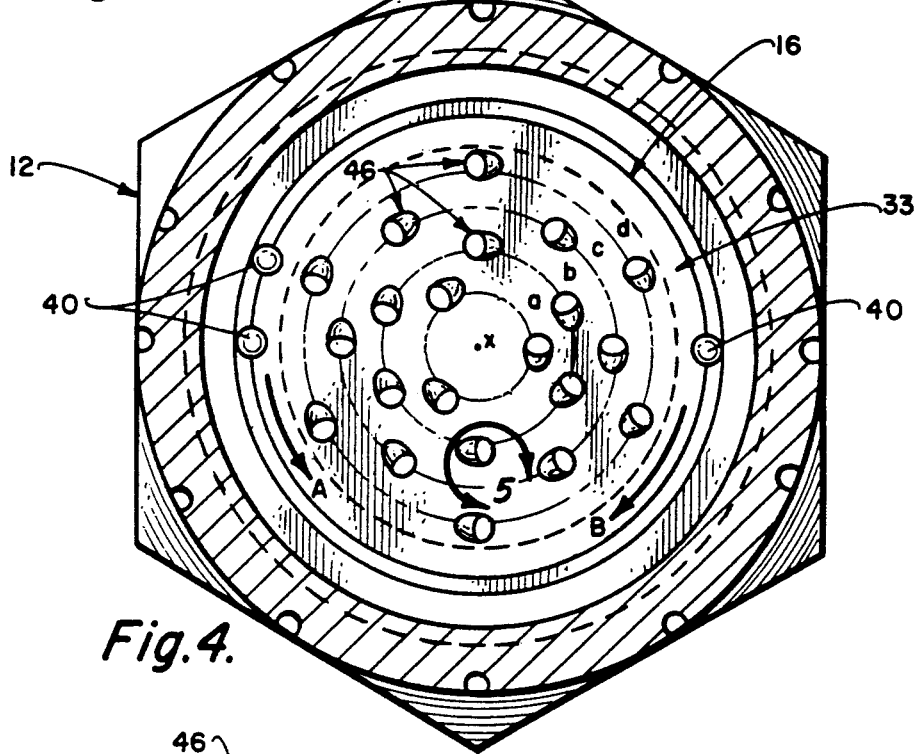
FIG. 4 is a reduced cross-sectional view taken along lines 4—4 of FIG. 3.
Figures 5, 6:
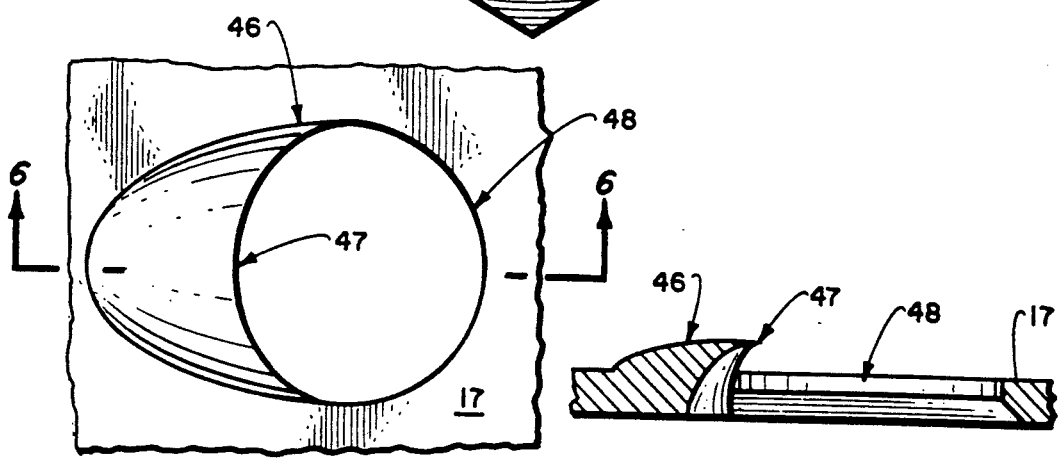
FIG. 5 is an enlarged fragmentary view taken along line 5 of FIG. 4.
FIG. 6 is a cross-sectional view taken along lines 6—6 of FIG. 5.

It has been found that particular patterns for the cutters is most efficient for effecting clean multiple cuts from a given mass of feedstock material. With reference to FIG. 4, such patterns involve the location of a given number of cutters to be spaced-apart at predetermined intervals along imaginary concentric circular lines "a, b, c, d" emanating radially outward from the cutter plate center axis "x". The outermost line "d" is spaced inward from the plate periphery for a purpose to be hereinafter made apparent.

Preferably, there should be at least three circular lines with an even number of cutters on at least two of the lines. Also, the cutters on each line are preferably unevenly spaced-apart but are aligned diametrically opposite each other when an even number is present. This is illustrated on Lines "b, c and d" which contain six cutters each. Line "a" is optional and is an exception with only three cutters spaced-apart equidistant but not in diametrical alignment. This is primarily a result of its being the innermost circle and having the shortest circumference.

When the cutters are arranged as above described, cutting action will be uniformly distributed throughout the cutting area of the plate. This permits the application of a more even torque and a smoother cutting action. Also, cutting effectiveness and efficiency will be maximized for each revolution of a feed mass over and against the cutters.

The housing extension comprises a cylindrical body with a central bore 15. It includes an attachment end 32 for releasable connection at annular joint 50 to the base housing upper portion 28. It extends the overall length of the assembly and provides an upper feed chamber defined by the central bore inner wall surface 52. Preferably, the central bore and cavity 26 are axially coextensive to provide a smooth transition through the annular joint.

Figure 3:
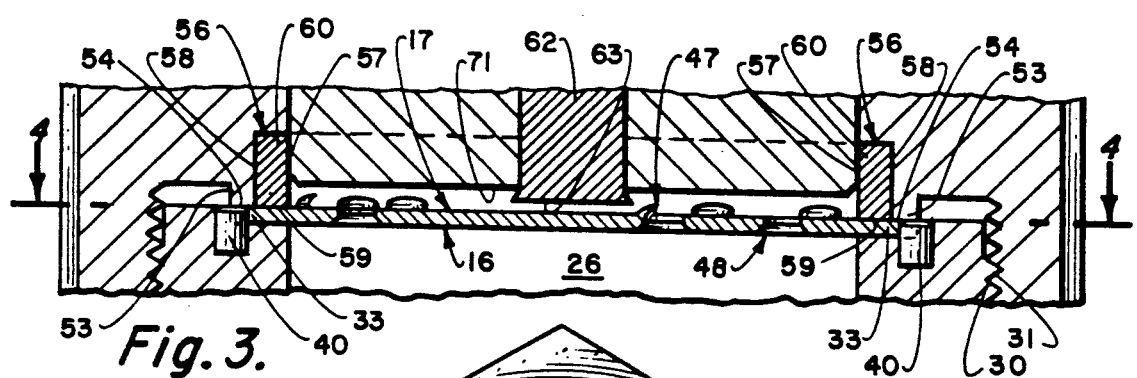
FIG. 3 is an enlarged fragmentary cross-sectional view taken along line 3 of FIG. 2.

As best seen in FIG. 3, attachment end 32 includes an annular projection 53 having an end face 54. As threads 31,32 engage each other through relative rotation between the extension and base, the face will be drawn down into engagement with the outermost periphery 33 of cutter plate 16. This insures that the plate will be securely held against unwanted uplifting or other movement.

The attachment end also includes an annular recess 56. This is located around the circumference of the lowermost inner wall 52. The recess is adjacent to, and radially inward from, projection 53. It is sized to receive a part of the lateral transfer means.

The basic function of the lateral transfer means is to effect movement of feedstock material into the cutters. This involves a three dimensional structure which is independently movable relative to the cutter plate and housing extension. It includes bearing surfaces for supporting it above the cutter plate within predetermined constraints. Such surfaces are provided by the outer wall 58 and bottom end 59 of a support ring 60.

The ring has a circular open band-like construction which is coextensive with annular recess 56. It also has a diameter sufficient to enable the ring to interfit with the recess and be constrained while still fitting loose enough to enable it to revolve thereabout.

When the housing extension and base housing are connected, the annular recess will be open both laterally to the central bore and downwardly to the rim recessed portion 35. Therefore, when the cutter plate is in position on ledge 38, bottom end 59 of the ring will rest upon a corresponding annular portion of the plate upper surface. This portion is radially outward from imaginary line "d" and inward from the outermost peripheral portion 33 underlying projection 53. It coacts with bottom end 59 to provide a bearing surface during revolutions of the ring.

The width of the ring should be about equal to, or less than, the depth of the annular recess 56. In this way, when the ring is positioned in the recess, the ring inner wall 57 will be coextensive with bore wall 50 and form a smooth transition about the upper area of joint 50.

Secured to the support ring and upstanding therefrom, is partition 62. When the ring is located within recess 56, the partition will extend into the central bore a distance preferably greater than half the axial extent of the bore.

As best shown in FIGS. 2, 3 and 7, the partition comprises a flat rectangular panel defined by a lower end 63 from which extend opposing side edges 64,64 that terminate at a top end 65. The lowermost portions of the side edges are secured to corresponding opposing portions of ring inner wall 57.

Preferably, the side edges are straight and the connection occurs at diametrically opposite portions of the ring. Also, the partition preferably extends perpendicular to the plane defined by the ring. As so connected and aligned, the side edges will be slightly offset and free of contact with the bore walls 52. As seen in FIG. 3, the partition is positioned so that its lower end 63 will be elevated from the plane defined by ring bottom end 59, a distance sufficient to clear the cutter blades 47.

With the partition mounted on diametrically opposite sides of the support ring, the central bore will be divided in half. Hence, when feed material is placed on each side of the partition, each half width of the partition will function as an actuator for moving feed material laterally into the cutting elements. However, unless a downward force is also exerted upon the feed material, the resistance to cutting will simply deflect the material away from the elements. For this reason, a driver implement becomes necessary.

As illustrated in FIGS. 1, 2 and 7, the driver means 20 comprises an implement having a core plug 68 integral with an upper knob 70. The plug is a solid cylindrical structure. It could also be hollow. It has a diameter slightly less than bore 15 to permit easy movement therein. At the proximal end of the plug is an outwardly extending annular shoulder 74. Extending upwardly from the shoulder is stem 76 which merges into the aforementioned knob 70.

The shoulder provides an engagement surface for the upper end 75 of the housing extension. Therefore, the plug length should not exceed the axial distance from the shoulder to the lower end 63 of the partition. Otherwise, unwanted contact with the cutter blades will occur.

As best shown in FIG. 3, the plug distal end 71 is slightly above partition end 63 and is, therefore, clear of the cutter elements. It can also be seen that recess 56 at the lowermost bore inner portion allows the plug to pass by the inner wall 57 of the ring without interference.

Extending upwardly from the plug distal end 71 is slot 72. The slot extends diametrically across the entire plug diameter and upwardly a distance at least equal to the height of partition 62. The slot width slightly exceeds the partition width whereby rotational movement of knob 70 will result in a direct and immediate rotation of the partition and ring structure.

To begin operation, the driver means will be removed and pieces of severable feedstock material will be placed into either or both sides of the bifurcated bore. Thereafter, the core plug will be placed into the bore and oriented so that the slot will engage the partition. The plug will move downwardly in the bore until the distal end contacts the feedstock material. As so disposed, the knob can be manually rotated with one hand while the other hand is used to hold the base housing in a stationary manner. Rotation of the knob should be in the direction shown by arrows "B" in FIGS. 4 and 7. This action will cause the partition to impart a lateral movement to the feed material and drive the material into the upraised cutter elements. Simultaneous with the rotation, a downward force will also be applied to the knob. This will cause distal end 71 to push the pieces of material against cutter plate 16.

As the material is driven into the cutter elements, the geometrical dimensions of the arched elements will function to sever round-shaped particles from the pieces of material. Likewise, the associated cutter opening will only permit passage of cut particles that don't exceed the given diameter of the opening. As they pass through the openings, the particles will fall by gravity into cavity 26. Since the cavity is closed, it's cleanliness and sterility can be controlled.

As a result of the unique lay-out of the cutter elements, maximum efficiency will occur per revolution of the driver means. Hence, less effort will be expended, less time will be required, less damage will occur to the feedstock pieces, cleaner cuts will be made, the cut particles will be more uniform and cellular damage will be minimized.

When cutting is finished, the device is easily dismantled simply by rotation and disengagement of the base and extension. This allows the cutter plate to be lifted off the top opening and the cavity contents to be removed. Thereafter, the cutter plate can be replaced and the parts cleaned and prepared for reuse.

While the foregoing description sets forth an illustrative embodiment in specific detail, it will be apparent that variations, alterations and/or modifications could be made without departing from the spirit of the invention. Therefore, the invention is not to be limited by the aforesaid embodiment, but only by the scope of the appended claims.

I claim:

1. An assembly for severing particles from a feedstock material comprising:

a base housing having an upper portion that includes an open top leading to an interior cavity with a closed bottom for receiving said particles;

a cutter plate overlying said open top having cutter means for severing said material;

a housing extension having an attachment end which releasably connects with said upper portion to form an elongated housing, said housing extension having a central bore to receive said material;

lateral transfer means positioned above said cutter plate for moving said material across said cutter plate, said transfer means being independently movable relative to said housing extension and said cutter plate; and, driver means positioned in said bore for pressing said material against said cutter means.

2. The assembly of claim 1 wherein said lateral transfer means is provided with bearing surfaces for supporting said transfer means within the constraints of said central bore.

3. The assembly of claim 2 wherein said lateral transfer means comprises a support ring secured to a partition which extends into said bore.

4. The assembly of claim 3 wherein said bearing surfaces comprise the outer wall surface and bottom end of said ring.

5. The assembly of claim 4 wherein the bottom end of said ring bears against an annular peripheral portion of said cutter plate upper surface.

6. The assembly of claim 3 wherein said partition is defined by a lower end from which extend opposing side edges which terminate at a top end, said partition being secured to said ring so that said lower end is offset above the bottom end of said ring.

7. The assembly of claim 6 wherein said partition side edges are spaced-apart from corresponding adjacent bore side walls.

8. The assembly of claim 1 wherein said lateral transfer means comprises an upstanding partition mounted upon a support ring.

9. The assembly of claim 8 wherein said central bore includes an annular recess proximate said attachment end for receiving said ring.

10. The assembly of claim 9 wherein said cavity and said central bore are axially coextensive.

11. The assembly of claim 1 wherein said upper portion includes an inner ledge for receiving an outer peripheral portion of said cutter plate.

12. The assembly of claim 11 wherein said attachment end has an end face for releasable engagement with said outer peripheral portion.

13. The assembly of claim 1 wherein said cutter means comprises raised cutting elements adjacent openings through said cutter plate, said openings being spaced-apart along circular paths which are concentrically located radially outward from the center of said cutter plate.

14. A device for cutting particles from a solid mass comprising:
   a receptacle for collecting said particles having an upper portion with a top opening;
   a removable cutter plate overlying said top opening, said plate having cutting means for severing particles from said mass;
   an extension for said receptacle detachably connected to said upper portion, said extension having a central bore in communication with said receptacle for receiving said mass;
   a ring positioned to freely rotate above an annular portion of the cutter plate upper surface;
   a partition secured to opposing portions of said ring and extending upwardly into said bore for moving said mass laterally into said cutting means; and,
   a driver implement removably insertable into said bore for engagement with said partition to permit the transfer of torque from said implement to said partition, said implement including a distal end for pushing said mass downwardly against said cutting means.

15. The device of claim 14 wherein said cutter plate comprises a flat disc and said cutting means comprises a plurality of cutting elements adjacent cutter openings through said plate which are arranged in a predetermined circular pattern about said plate.

16. The device in claim 15 wherein each cutting element comprises an arched blade extending over a portion of said cutter opening with each blade facing in the same circular direction.

17. The device of claim 15 wherein a predetermined number of said cutting elements are spaced-apart at predetermined intervals along concentric circular lines located radially outward from the center axis of said disc to an outermost line spaced inward from the disc periphery.

18. The device of claim 17 wherein there are at least three circular lines with an even number of cutting elements on each of at least two lines with the cutting elements on each respective line being unevenly spaced-apart but aligned diametrically opposite each other.

19. The device of claim 17 wherein an annular area of said disc radially outward from the outermost circular line and inward from the disc periphery defines a bearing surface for movement of said ring.

20. The device of claim 15 including an annular recess about the inner periphery of said central bore adjacent to said top opening, said ring being received within said annular recess for rotational movement about said bore.

* * * * *